(12) United States Patent
Meadows

(10) Patent No.: US 11,617,472 B2
(45) Date of Patent: Apr. 4, 2023

(54) REMOVABLE ASH CLEAN OUT ASSEMBLY

(71) Applicant: Dansons US, LLC, Phoenix, AZ (US)

(72) Inventor: Glen Meadows, Gilbert, AZ (US)

(73) Assignee: Dansons US, LLC, Scottsdale, AZ (US)

(*) Notice: Subject to any disclaimer, the term of this patent is extended or adjusted under 35 U.S.C. 154(b) by 574 days.

(21) Appl. No.: 16/709,456

(22) Filed: Dec. 10, 2019

(65) Prior Publication Data

US 2021/0169270 A1    Jun. 10, 2021

(51) Int. Cl.
*A47J 37/07* (2006.01)
*A23B 4/052* (2006.01)
*F24B 1/191* (2006.01)

(52) U.S. Cl.
CPC ........... *A47J 37/0786* (2013.01); *A23B 4/052* (2013.01); *A47J 37/0718* (2013.01); *F24B 1/1915* (2013.01); *A23V 2002/00* (2013.01)

(58) Field of Classification Search
None
See application file for complete search history.

(56) References Cited

U.S. PATENT DOCUMENTS

| 6,223,737 | B1 | 5/2001 | Buckner |
| 2019/0133374 | A1 | 5/2019 | McAdams et al. |

FOREIGN PATENT DOCUMENTS

| DE | 202017105189 U1 | * 10/2017 |
| WO | 2018208919 | 11/2018 |

OTHER PUBLICATIONS

Ningbo English translation.*
Australian Examination Report No. 1 for Application No. 2020286190, dated Jul. 28, 2021, 3 pages.
European Search Report for Application No. EP20212635.5 dated Mar. 15, 2021, 10 pages.

* cited by examiner

*Primary Examiner* — Jason Lau
(74) *Attorney, Agent, or Firm* — Seyfarth Shaw LLP

(57) ABSTRACT

Disclosed is an ash clean out mechanism including a burn pot removable from the remainder of the appliance to allow easier cleaning of the auger or other functional components within the appliance. The burn pot can include a handle that a user can pull to remove the burn pot from an adapter collar located within the interior of the appliance. The user can then clean the interior of the appliance and thereafter insert the burn pot into the appliance. For example, the user can push the burn pot by guiding a lower plate of the burn pot along a lip of the appliance and into a landing area where a body of the burn pot can rest on the adapter collar. The burn pot can also form a flow channel around the burn pot body to provide improved airflow during the cooking process.

16 Claims, 7 Drawing Sheets

REMOVABLE ASH CLEAN OUT ASSEMBLY

TECHNICAL FIELD OF THE INVENTION

The presently disclosed embodiments relate generally to outdoor appliances. More particularly, the presently disclosed embodiments relate to a removable assembly that allows a user to clear ash from a grill or smoker.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Grills can use a similar process to burn fuel, typically at higher temperatures, to likewise provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid going above the desired temperature, similar to a thermostat system.

When pellets are exposed to moisture, the pellets tend to stick together and jam the auger. In addition, ash and debris from burning of the pellets accumulate around the auger. Accordingly, the auger needs to be cleaned of this debris or it will jam and later malfunction. Typical cleaning methods involve removing a hinged panel to reach inside the auger and clean with a tool such as a brush. More extensive cleaning can be performed by removing the auger itself, but this potentially requires the removal of one or more of panels, an auger motor, and possibly the controller, all while using tools that may not be accessible at the time.

SUMMARY OF THE INVENTION

The presently disclosed embodiments broadly comprise an ash clean out mechanism that allows for a burn pot to be removed from the remainder of the appliance to allow easier cleaning of the auger or other functional components within the appliance. The burn pot can be removed by pulling on a handle attached to the burn pot body, and removing the burn pot body from an adapter collar within the interior of the appliance. The user can then clean the interior of the appliance. Thereafter, the user can push the burn pot back into the interior of the appliance, guiding a lower plate of the burn pot along a lip of the mechanism housing and into a landing area where a body of the burn pot can rest on the adapter collar. The burn pot can also include a flow channel extending circumferentially around the burn pot body and providing improved air flow during the cooking process.

In particular, the presently disclosed embodiments include an appliance including a mechanism housing removably coupled to a burn pot. The mechanism housing includes a hopper that receives fuel to be combusted, an auger that dispenses the fuel according to a control, and a hot rod that combusts the fuel when distributed by the auger. The burn pot includes a burn pot body that receives the fuel dispensed from the auger, and a lower plate located underneath the burn pot body and that rests on the landing area during use of the appliance.

The presently disclosed embodiments further include an appliance including a mechanism housing removably coupled to a burn pot. The mechanism housing includes an auger that dispenses the fuel according to a control, and a heat source that combusts the fuel when distributed by the auger. The burn pot includes an adapter collar forming a mating area, and a burn pot removably coupled to the mechanism housing and including a burn pot body that receives the fuel dispensed from the auger. The burn pot body is removably received within the adapter collar when the mechanism housing is coupled to the burn pot.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
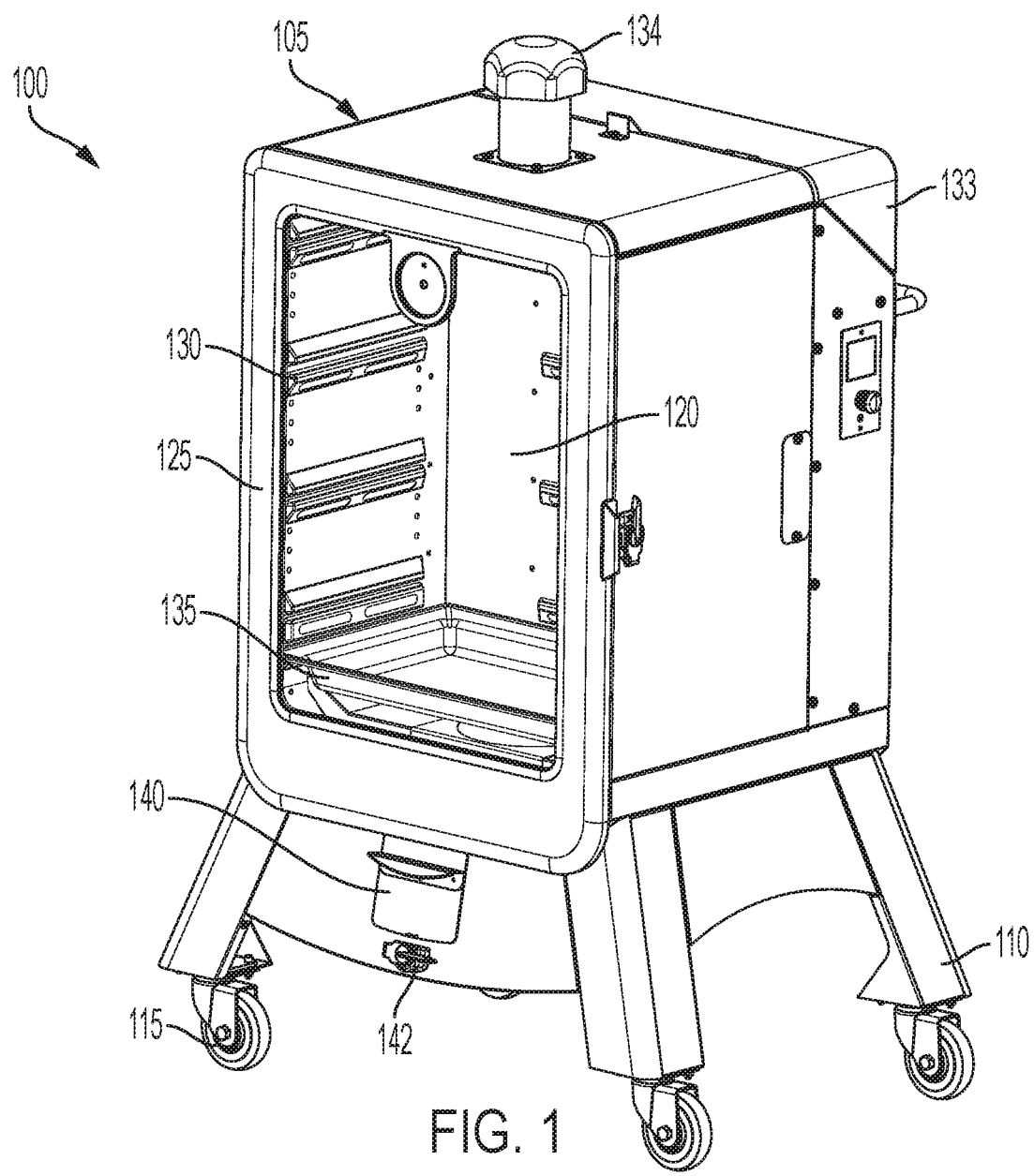
FIG. 1 is a front perspective view of an appliance according to at least one of the presently disclosed embodiments.
Figure 2:
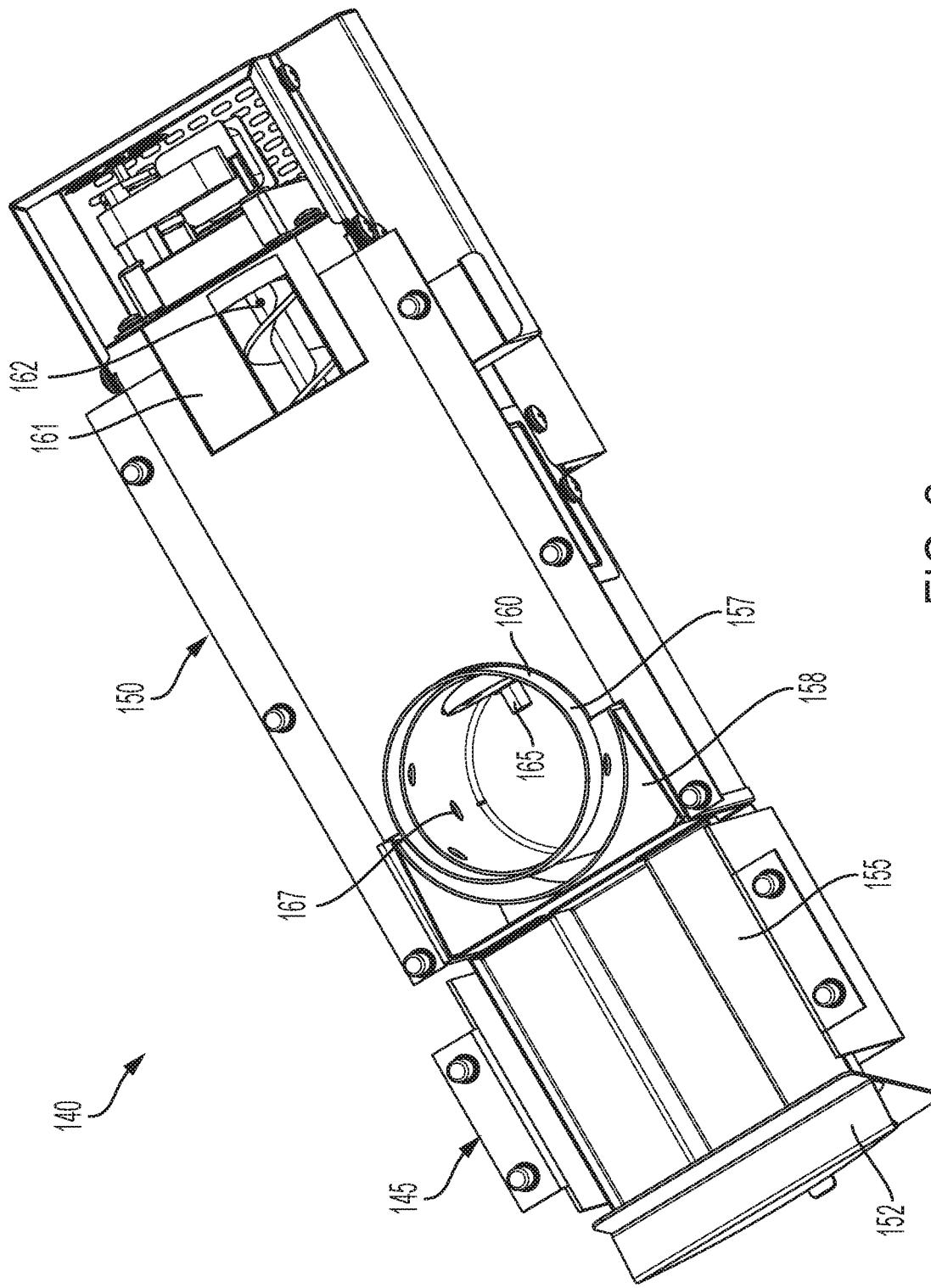
FIG. 2 is a top view of a burn pot coupled to a mechanism housing according to at least one of the presently disclosed embodiments.
Figure 3:
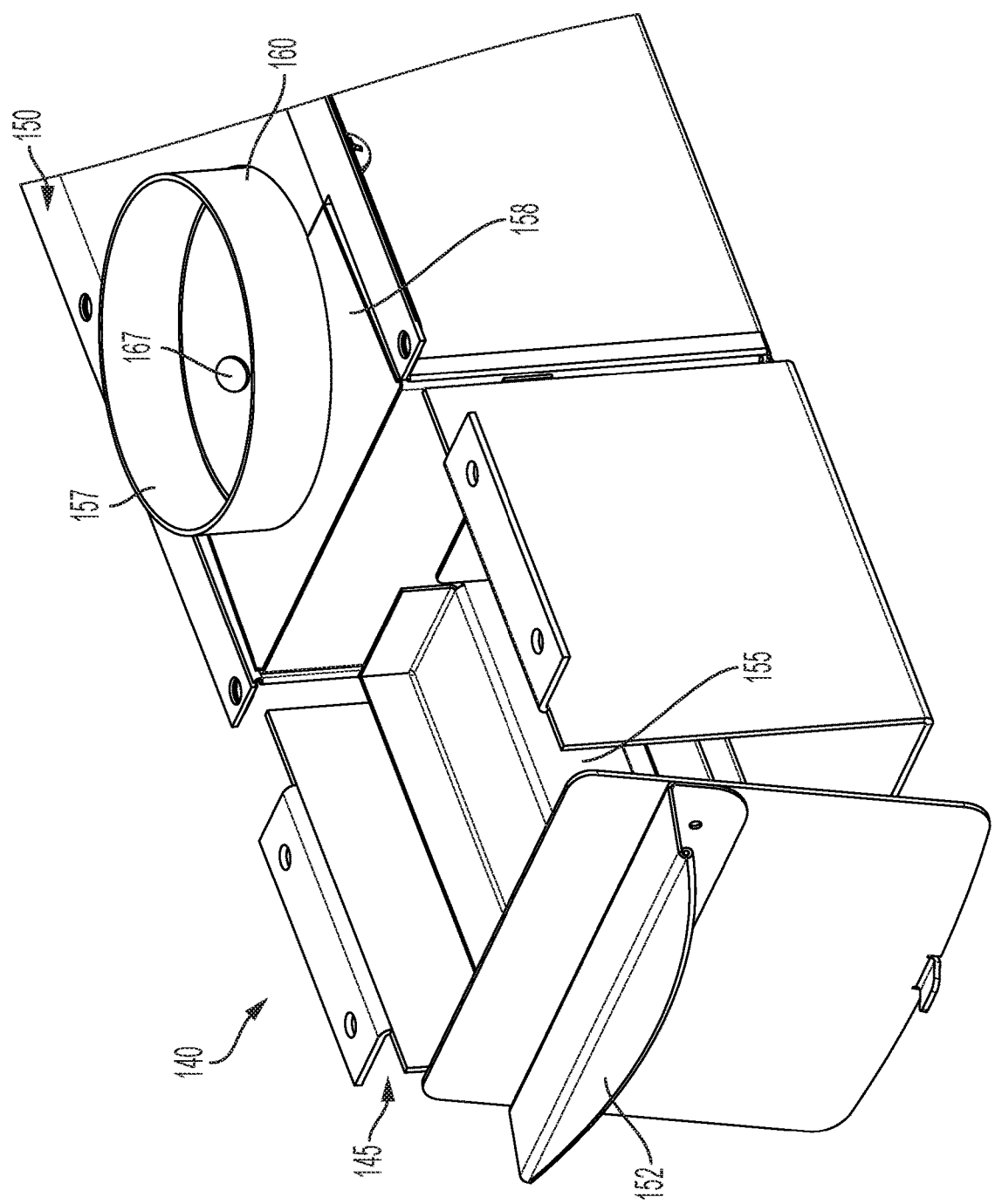
FIG. 3 is a front perspective view of the burn pot coupled to the mechanism housing according to at least one of the presently disclosed embodiments.
Figure 4:
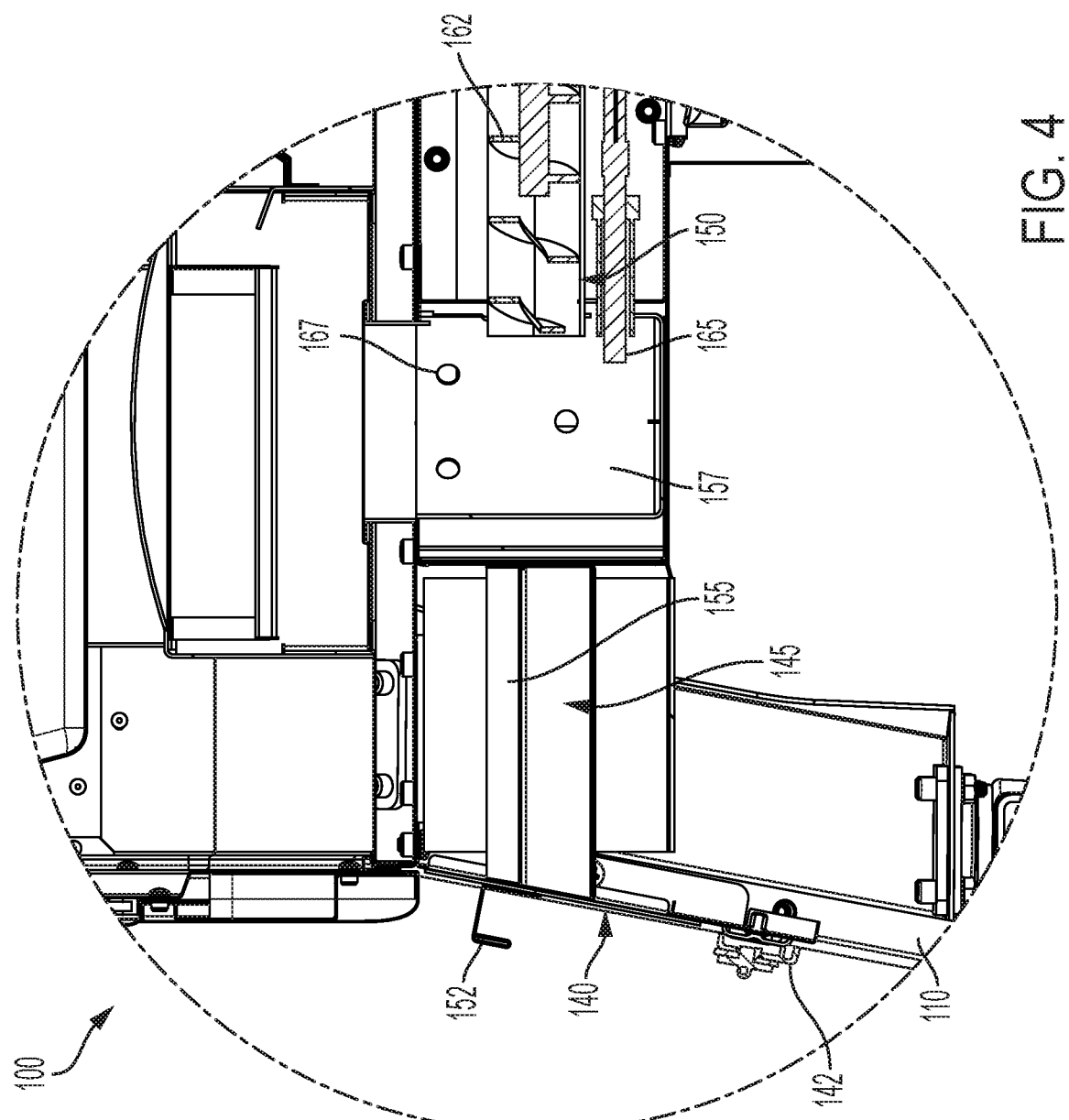
FIG. 4 is a side view of the burn pot coupled to the mechanism housing according to at least one of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include an ash clean out mechanism with a burn pot removably coupled to the remainder of the appliance to allow easier cleaning of the auger or other functional components within the appliance. The burn pot can include a handle attached to the burn pot body, and allowing the burn pot to be removed from an adapter collar within the interior of the appliance. The user can then clean the interior of the appliance and, thereafter, the user can push the burn pot back into the interior of the appliance. For example, the user can guide a lower plate of the burn pot along a lip of the mechanism housing and into a landing area where a body of the burn pot can rest on the adapter collar. The burn pot can also include a flow channel that is separate from the burn pot body and extends circumferentially around the burn pot body to provide improved airflow during the cooking process.

As shown in FIG. 1, an appliance 100 includes a main body 105 coupled to a base 110 having wheels 115. Within the main body 105 is a cooking chamber 120 where food, for example, meat or vegetables, can be cooked in either a grilling or smoking application. The main body 105 can further include a door 125 on a first side of the main body 105 that allows the user to access the cooking chamber 120 so the user can retrieve or adjust the food being cooked within the cooking chamber 120. The main body 105 can also include rack holders 130 that hold racks where food can be placed during the cooking operation.

In certain exemplary embodiments, the appliance 100 is a pellet grill or smoker, for example, a vertical pellet smoker, although the present invention is not so limited. As shown, the appliance 100 can therefore include a hopper 133 on a second side of the main body 105 opposite the first side, and that receives pellets for operation in the pellet grill or smoker. This hopper 133 can be located on the rear of the appliance 100 for spatial reasons, as opposed to conventional pellet smokers, which include the hopper on the side in an offset nature. The appliance can further include a chimney 134 for directing exiting smoke and heat in an upwardly direction so as to provide the outlet for airflow through the appliance 100.

The main body 105 can further include a grease tray 135 for receiving grease or other external matter that is removed from the food inside the cooking chamber 120. The grease tray 135 can also receive water or flavored liquids such as apple juice or cider, to provide additional moisture to the cooking chamber 120 during use. The temperature inside the cooking chamber 120 can be adjusted and controlled by a controller (not shown) that can be set by a user to control the internal temperature of the cooking chamber 120. For example, a user can set the cooking chamber 120 to a temperature of 225 degrees, and the appliance will burn fuel or otherwise heat the cooking chamber 120 until the temperature reaches 225 degrees based on a temperature sensor located within the cooking chamber 120. Once the temperature reaches 225 degrees, the controller will control the heating mechanism of the appliance to reduce or eliminate the supply of heat temporarily. For example, and without limitation, the controller can then decrease the heat provided by preventing the supply of pellets to a burn pot, as described below in more detail. However, the appliance 100 is not limited to a pellet smoker or grill and the heat can be suspended by reducing or eliminating the power or current provided to an electronic heating element, as with a conventional electronic smoker.

As shown in FIGS. 2-7, the appliance 100 can include an ash clean out mechanism 140 that allows a user to more conveniently remove ash or otherwise clean the interior of the appliance 100. The ash clean out mechanism 140 can be locked with a lock 142 that either manually or automatically locks the ash clean out mechanism 140. For example, the lock 142 can be an automatic lock that includes a temperature sensor and that locks the ash clean out mechanism 140 if the temperature is too high, so as to avoid injury to the user. Alternatively, or in addition to the above, the lock 142 can selectively lock the ash clean out mechanism 140 with a simple mechanical function, based on input by the user. For example, a user can rotate the lock 142 in a first rotational direction to lock the ash clean out mechanism 140 in place, and rotate the lock 142 in a second rotational direction opposite the first rotational direction to unlock the ash clean out mechanism 140. Any other form of a lock, or no lock 142 at all, can be implemented without departing from the spirit and scope of the presently disclosed embodiments.

The ash clean out mechanism 140 can include two main components: a burn pot 145 and a mechanism housing 150. The burn pot 145 and mechanism housing 150 can be removably coupled to one another such that the burn pot 145 can be removed from the mechanism housing 150 and, as a result, removed from the appliance 100 to allow cleaning or general access to the internal components thereof. For example, a user can pull on a handle 152 attached to the burn pot 145 and dislodge the burn pot 145 from the mechanism housing 150 to allow access to the inside of the appliance 100. The burn pot 145 can also include a separation area 155 that separates the hot components of the appliance 100 from a user's hand, to therefore allow the handle 152 to be safely grasped without burning the user. For example, the separation area 155 can space and therefore separate the handle 152 from the hot rod, discussed in more detail below.

The burn pot 145 can include a burn pot body 157 coupled to and extending from a burn pot support plate 158. The burn pot body 157 receives pellets or other fuel and is the area where the fuel is combusted to create smoke and heat. The mechanism housing 150 can include an adapter collar 160 that is the complement to the burn pot support plate 158 and that, together with the burn pot support plate, forms a circular support extending circumferentially around the burn pot body 157. For example, the burn pot support plate 158 provides a semi-circular structural support for the burn pot body 157 on the burn pot 145 side of the burn pot body 157; and the adapter collar 160 can provide another semi-circular structural support as a mating area for the burn pot body 157 on the mechanism housing 150 side of the burn pot body 157. The adapter collar 160 can effectively serve as the surface upon which the burn pot body 157 rests once the ash clean out mechanism 140 is inserted entirely into the appliance.

The mechanism housing 150 can house various components of the appliance that allow it to function and combust fuel such as pellets. For example, the mechanism housing 150 can include a funnel 161 that directs fuel such as pellets into an auger 162. The auger 162 can therefore provide the fuel in a controlled fashion to a hot rod 165 or other heat source that is heated according to control by a controller. For example, the hot rod 165 can be heated by an electrical current provided by the controller. The hot rod 165, when activated, can then heat the pellets or other fuel within the burn pot body 157 and the resulting smoke and heat can escape through holes 167 in the burn pot body 157, eventually flowing to the cooking chamber 120.

The burn pot 145 can include various structural components that improve the airflow and functionality of the burn pot 145 when coupled with the mechanism housing 150. For example, the burn pot 145 can include a lower plate 169 and an outer plate 172, and can further include openings for the mechanical components of the appliance 100. In one embodiment, the burn pot body 157 can include an auger opening 175 that allows for insertion of the auger 162; and a hot rod opening 178 that allows for insertion of the hot rod 165 into the burn pot body 157, when the burn pot 145 is inserted into the mechanical housing 150.

Figure 7:
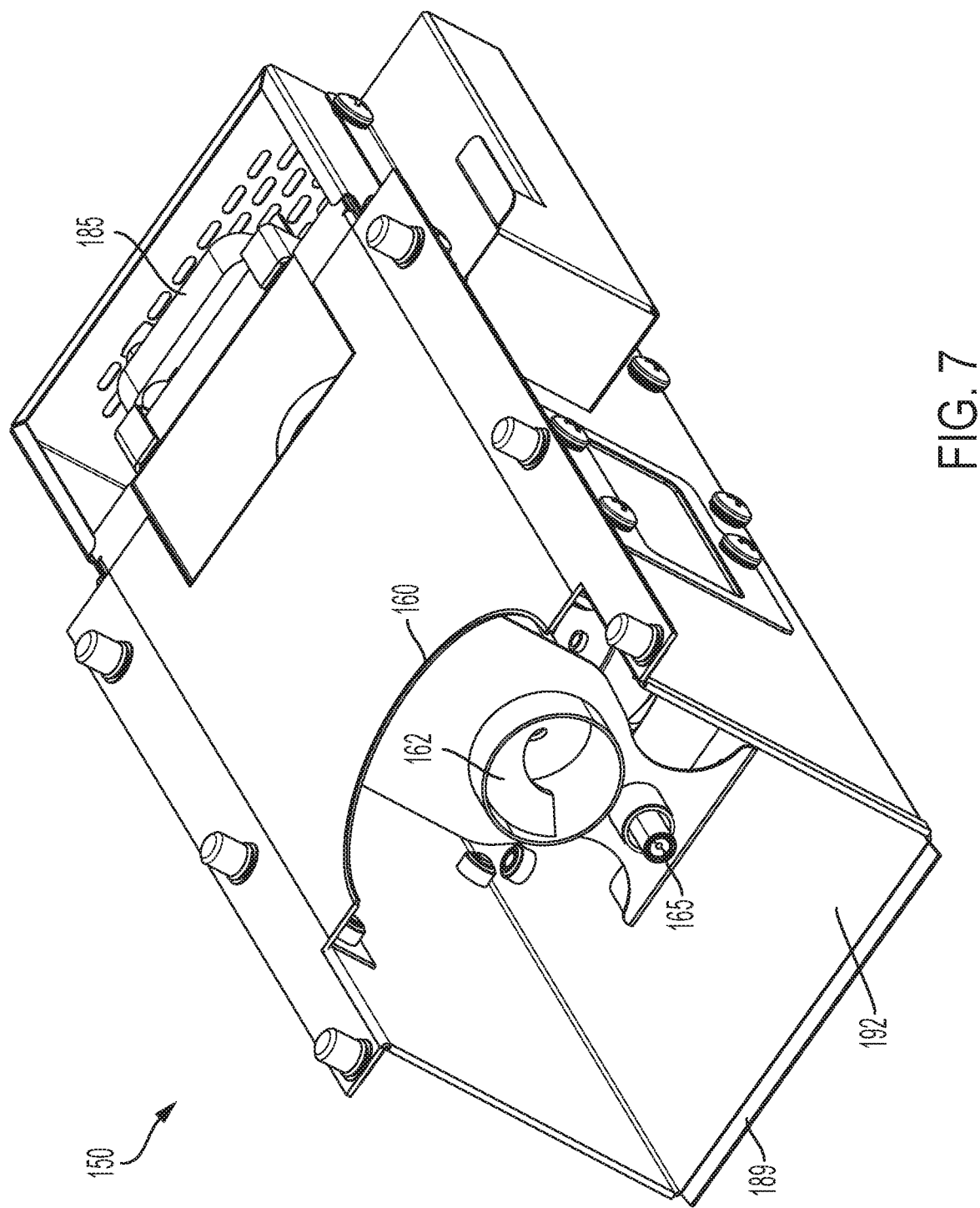
FIG. 7 is a top front perspective view of the mechanism housing according to at least one of the presently disclosed embodiments.

The burn pot 145 can form a structure around the burn pot body 157 that provides improved airflow through the burn pot body 157 and throughout the assembly itself. For example, the lower 169 and outer 172 plate, together with the burn pot support plate 158, form a flow channel 182 where air can circulate to provide greater turbulence through the burn pot body 157 so that the smoke and heat combusted within the burn pot body 157 may flow through the appliance 100 in a more advantageous manner. In one embodiment, the flow channel 182 can extend at least partially around the outer circumference of the burn pot body 157. As shown in FIG. 7, a fan 185 can be provided within the mechanism housing 150 to facilitate the flow of air through the burn pot body 157 and, more broadly, the appliance 100.

Figure 5:
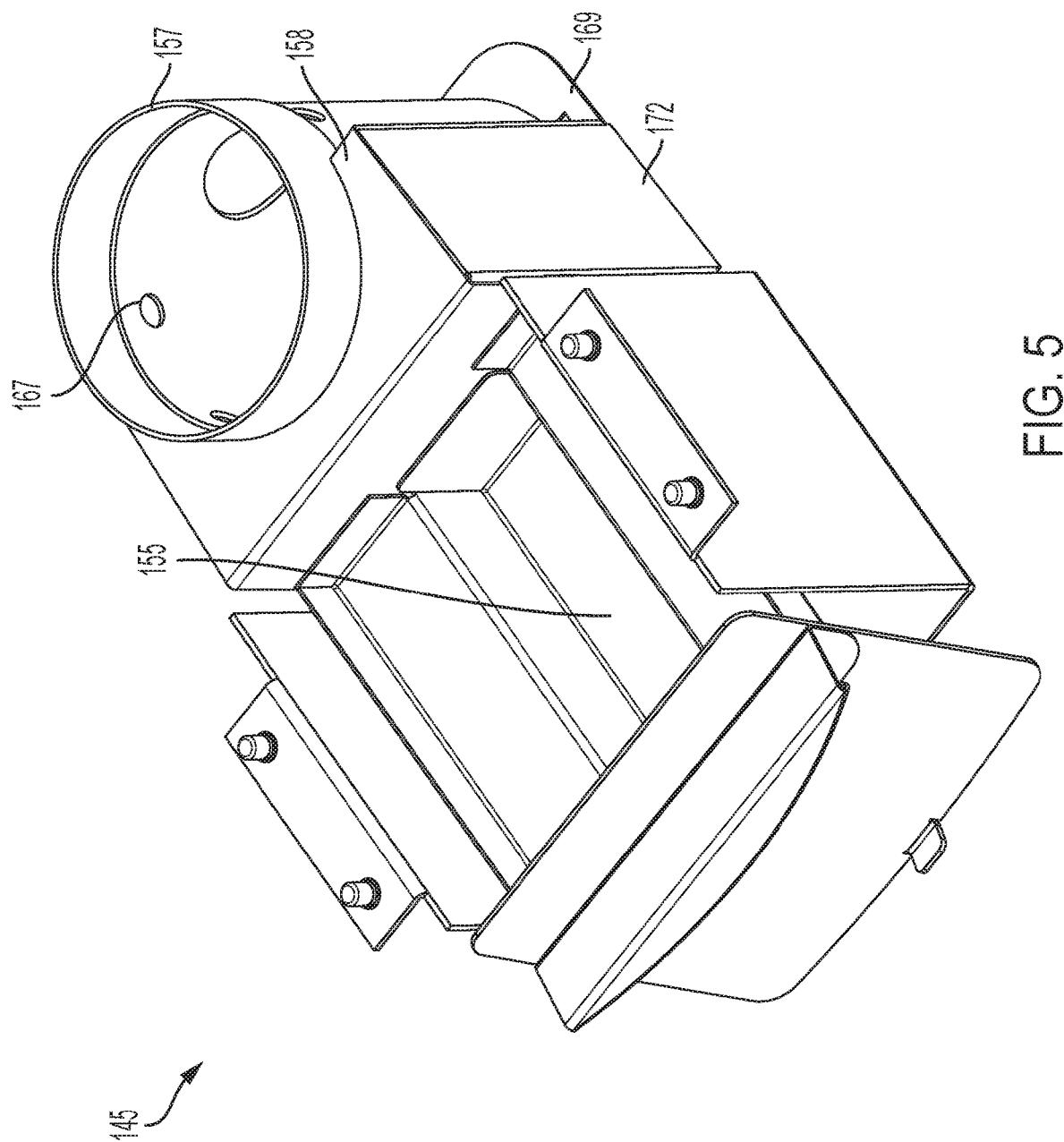
FIG. 5 is a top front perspective view of the burn pot according to at least one of the presently disclosed embodiments.
Figure 6:
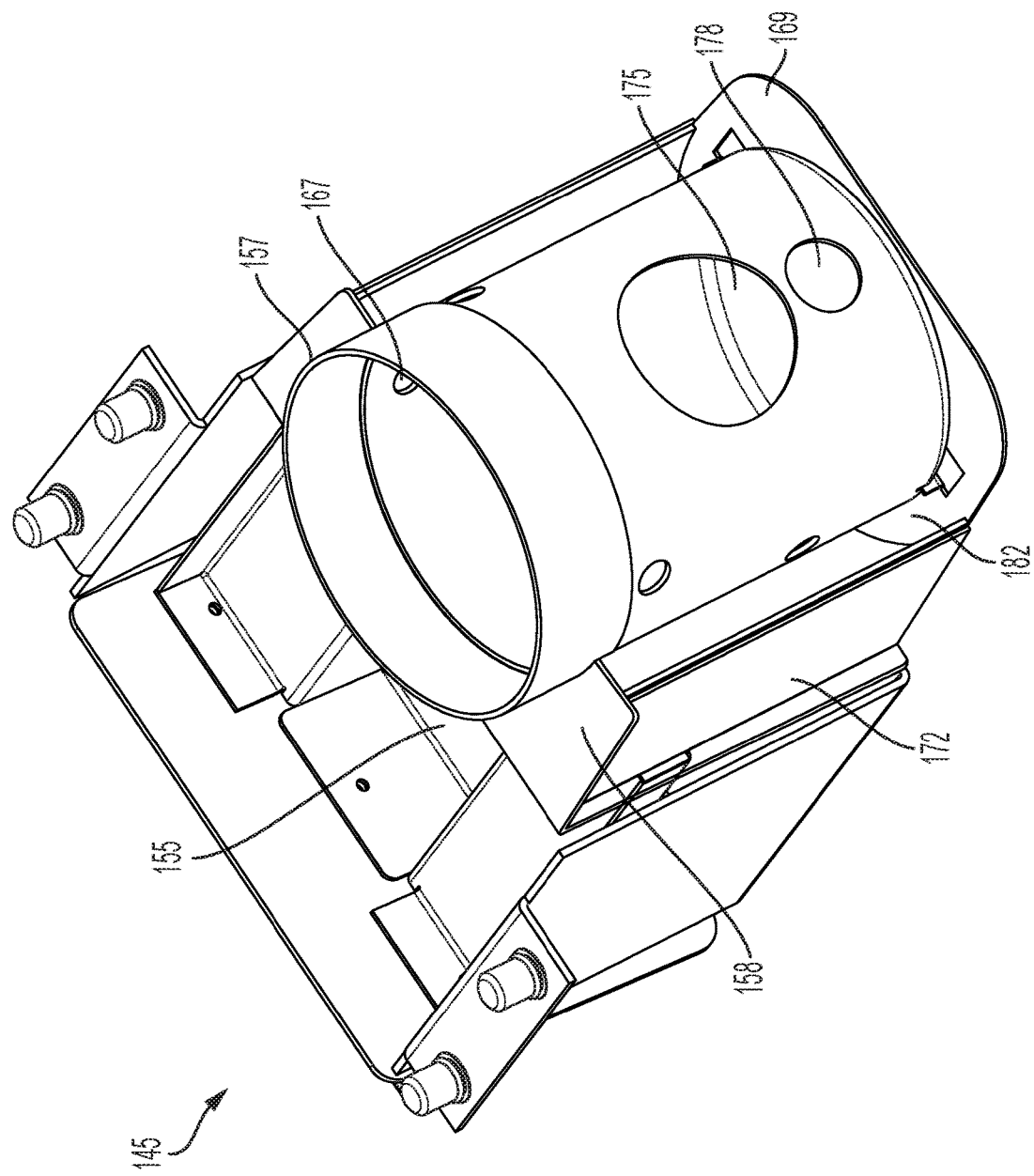
FIG. 6 is top rear perspective view of the burn pot according to at least one of the presently disclosed embodiments.

A process of inserting and removing the burn pot 145 from the mechanism housing 150 will now be discussed with reference to FIGS. 5-7. As shown, the lower plate 169 can serve as the guiding structure when the burn pot 145 is inserted into the appliance 100. For example, the lower plate 169 of the burn pot 145 can abut a lip 189 of the mechanism housing 150, which is angled downward (i.e., extending at an angle away from the landing area, as shown in FIG. 7) so as to provide a chamfer effect and allow insertion of the burn pot 145 into the mechanism housing 150. Once inserted, the lower plate 169 can rest within a landing area 192 of the mechanism housing 150 where the burn pot 145 can remain during use of the appliance 100.

As used herein, the terms "grill" or "smoker" are intended to be construed broadly as including any outdoor cooking appliance that uses heat. For example, a "grill" or "smoker" according to the present invention can include a grill, smoker, griddle, burner, wood stove, outdoor heater, or any other outdoor cooking appliance that uses heat.

As discussed herein, the heat source can be a hot rod that heats pellets. However, any heat source can be implemented without departing from the spirit and scope of the presently disclosed embodiments. For example, and without limitation, the heat source can be charcoal, electric heat, gas combustion heat, radiant heat, thermomagnetic heat, steam, or any other form of heat.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An appliance comprising:
   a mechanism housing including:
      a hopper that receives fuel to be combusted;
      an auger that dispenses the fuel according to a control;
      an adapter collar forming a mating area;
      a landing area; and
      a hot rod that combusts the fuel when distributed by the auger; and
   a burn pot extending in an axial direction and removable from the mechanism housing in the axial direction, the burn pot including:
      a burn pot body that receives the fuel dispensed from the auger and that includes an auger opening that receives the auger extending through the burn pot in the axial direction when the burn pot is coupled to the mechanism housing;
      a lower plate coupled to an underside of the burn pot body, the lower plate resting on the landing area during use of the appliance; and
      a burn pot support plate from which the burn pot body extends, and wherein the burn pot support plate extends around a partial circumference of the burn pot body, and wherein a remainder of the circumference of the burn pot body rests within the mating area of the mechanism housing when the burn pot is coupled to the mechanism housing.

2. The appliance of claim 1, wherein the burn pot body includes a hot rod opening that receives the hot rod when the burn pot is coupled to the mechanism housing.

3. The appliance of claim 1, wherein the burn pot includes a burn pot support plate from which the burn pot body extends and an outer plate connecting the burn pot support plate to the lower plate, and wherein the burn pot support plate, outer plate, and lower plate collectively form a flow channel surrounding the burn pot and through which air can flow.

4. The appliance of claim 1, wherein the mechanism housing includes a lip extending at an angle away from the landing area.

5. The appliance of claim 1, wherein the burn pot includes a handle allowing a user to pull and remove the burn pot.

6. The appliance of claim 5, wherein the burn pot includes a separation area spacing the handle from the hot rod.

7. The appliance of claim 1, further comprising a lock operatively coupled to a temperature sensor, the lock automatically locking the burn pot in a coupled position with the mechanism housing when the temperature sensor senses a predetermined threshold.

8. The appliance of claim 1, further comprising a funnel that directs the fuel into the auger.

9. An appliance comprising:
   a mechanism housing including:
      an auger that dispenses fuel according to a control;
      a heat source that combusts the fuel when distributed by the auger; and
      an adapter collar forming a mating area;
      a landing area; and
   a burn pot extending in the axial direction and removable from the mechanism housing in the axial direction, the burn pot including:
      a burn pot body that receives the fuel dispensed from the auger, the burn pot body including an auger opening that receives the auger extending through the burn pot in the axial direction when the burn pot is coupled to the mechanism housing; and
      a lower plate coupled to an underside of the burn pot body, the lower plate resting on the landing area during use of the appliance; and
      a burn pot support plate from which the burn pot body extends, and wherein the burn pot support plate extends around a partial circumference of the burn pot body, and wherein a remainder of the circumference of the burn pot body rests within the mating area of the mechanism housing when the burn pot is coupled to the mechanism housing.

10. The appliance of claim 9, wherein the burn pot body includes a heat source opening that receives the heat source when the burn pot is coupled to the mechanism housing.

11. The appliance of claim 9, wherein the heat source is a hot rod.

12. The appliance of claim 9, wherein the burn pot body includes an auger opening that receives the auger, and a heat source opening that receives the heat source, when the burn pot is coupled to the mechanism housing.

13. The appliance of claim 9, wherein the burn pot includes a burn pot support plate from which the burn pot body extends and an outer plate connecting the burn pot support plate to the lower plate, and wherein the burn pot support plate, outer plate, and lower plate collectively form a flow channel surrounding the burn pot and through which air can flow.

14. The appliance of claim 10, wherein the mechanism housing includes a lip extending at an angle away from the landing area, and wherein the lower plate abuts the lip during a coupling of the burn pot into the mechanism housing so as to guide the burn pot onto the landing area.

15. The appliance of claim 9, wherein the burn pot includes a handle allowing a user to pull and remove the burn pot from the mechanism housing, and wherein the burn pot includes a separation area spacing the handle from the heat source.

16. The appliance of claim 9, further comprising a lock operatively coupled to a temperature sensor, the lock automatically locking the burn pot in a coupled position with the mechanism housing when the temperature sensor senses a predetermined threshold.

\* \* \* \* \*